US008627300B2

(12) United States Patent
Kruglick

(10) Patent No.: US 8,627,300 B2
(45) Date of Patent: Jan. 7, 2014

(54) PARALLEL DYNAMIC OPTIMIZATION

(75) Inventor: Ezekiel John Joseph Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 688 days.

(21) Appl. No.: 12/578,295

(22) Filed: Oct. 13, 2009

(65) Prior Publication Data

US 2011/0088021 A1    Apr. 14, 2011

(51) Int. Cl.
*G06F 9/45* (2006.01)
(52) U.S. Cl.
USPC ........... 717/149; 717/150; 717/151; 717/152; 717/153; 717/154; 717/155; 717/156; 717/157; 717/158; 717/159; 717/160; 717/161
(58) Field of Classification Search
None
See application file for complete search history.

(56) References Cited

U.S. PATENT DOCUMENTS

| | | | |
|---|---|---|---|
| 4,210,962 A * | 7/1980 | Marsh et al. ................. | 705/7.11 |
| 4,916,659 A | 4/1990 | Persoon et al. | |
| 5,806,059 A | 9/1998 | Tsuchida et al. | |
| 5,826,079 A | 10/1998 | Boland et al. | |
| 6,289,369 B1 | 9/2001 | Sundaresan | |
| 6,567,806 B1 * | 5/2003 | Tsuchida et al. ..................... | 1/1 |
| 6,658,448 B1 | 12/2003 | Stefaniak et al. | |
| 6,745,336 B1 * | 6/2004 | Martonosi et al. ............ | 713/340 |
| 6,769,017 B1 | 7/2004 | Bhat et al. | |
| 6,782,410 B1 | 8/2004 | Bhagat et al. | |
| 7,143,412 B2 | 11/2006 | Koenen | |
| 7,146,607 B2 * | 12/2006 | Nair et al. ..................... | 717/151 |
| 7,363,523 B2 | 4/2008 | Kurts et al. | |
| 7,383,396 B2 * | 6/2008 | Wyman ........................ | 711/141 |
| 7,574,567 B2 * | 8/2009 | Wyman ........................ | 711/141 |
| 8,078,832 B1 | 12/2011 | Agarwal et al. | |
| 8,108,843 B2 * | 1/2012 | Nair et al. ..................... | 717/139 |
| 8,181,169 B2 * | 5/2012 | Nakaike et al. ............... | 717/151 |
| 8,214,817 B2 | 7/2012 | Mendelson et al. | |
| 8,443,341 B2 | 5/2013 | Berg et al. | |
| 2003/0171907 A1 * | 9/2003 | Gal-On et al. .................. | 703/14 |

(Continued)

FOREIGN PATENT DOCUMENTS

EP    1736851 A2    12/2006

OTHER PUBLICATIONS

Albonesi, D., "Selective Cache Ways: On-Demand Cache Resource Allocation," Nov. 1999, Proceedings of the International Symposium on Microarchitecture, 12 pages.

(Continued)

*Primary Examiner* — Henry Tsai
*Assistant Examiner* — Jing-Yih Shyu
(74) *Attorney, Agent, or Firm* — Hope Baldauff, LLC

(57) ABSTRACT

Technologies are generally described for parallel dynamic optimization using multicore processors. A runtime compiler may be adapted to generate multiple instances of executable code from a portable intermediate software module. The various instances of executable code may be generated with variations of optimization parameters such that the code instances each express different optimization attempts. A multicore processor may be leveraged to simultaneously execute some, or all, of the various code instances. Preferred optimization parameters may be determined from the executable code instances that may correctly complete in the least time, or may use the least amount of memory, or that may prove superior according to some other fitness metric. Preferred optimization parameters may be used to seed future optimization attempts. Output generated from the preferred instances may be used as soon as the first instance correctly completes block.

20 Claims, 6 Drawing Sheets

(56) References Cited

U.S. PATENT DOCUMENTS

| | | |
|---|---|---|
| 2003/0236919 A1 | 12/2003 | Johnson et al. |
| 2004/0181730 A1 | 9/2004 | Monfared et al. |
| 2005/0154861 A1 | 7/2005 | Arimilli et al. |
| 2005/0210472 A1 | 9/2005 | Accapadi et al. |
| 2005/0246461 A1 | 11/2005 | Accapadi et al. |
| 2006/0041599 A1* | 2/2006 | Tsuchida et al. ............. 707/200 |
| 2007/0027972 A1 | 2/2007 | Agrawal et al. |
| 2007/0044084 A1* | 2/2007 | Wang et al. .................. 717/151 |
| 2007/0079308 A1 | 4/2007 | Chiaramonte et al. |
| 2008/0046895 A1 | 2/2008 | Dillenberger et al. |
| 2008/0126751 A1 | 5/2008 | Mizrachi et al. |
| 2008/0178183 A1 | 7/2008 | Accapadi et al. |
| 2008/0229127 A1 | 9/2008 | Felter et al. |
| 2009/0031317 A1 | 1/2009 | Gopalan et al. |
| 2009/0031318 A1 | 1/2009 | Gopalan et al. |
| 2009/0070553 A1* | 3/2009 | Wallach et al. ................ 712/34 |
| 2009/0077562 A1 | 3/2009 | Sen et al. |
| 2009/0125894 A1* | 5/2009 | Nair et al. .................... 717/156 |
| 2009/0126006 A1 | 5/2009 | Zhang et al. |
| 2010/0122101 A1 | 5/2010 | Naffiger et al. |
| 2010/0225496 A1 | 9/2010 | Hou et al. |
| 2011/0088022 A1 | 4/2011 | Kruglick |
| 2011/0088038 A1 | 4/2011 | Kruglick |
| 2011/0093733 A1 | 4/2011 | Kruglick |

OTHER PUBLICATIONS

Bala, et al., "Dynamo: A Transparent Dynamic Optimization System," Jun. 2000, Proceedings of Programming Language Design and Implementation, 12 pages.

Baraz, et al., "IA_32 Execution Layer: A Two-Phase Dynamic Translator Designed to Support IA-32 Application on Itanium®-based Systems," Dec. 2003, Proceedings of the 36th International Symposium on Microarchitecture, 11 pages.

Dehnert, et al., "The Transmeta Code Morphing™ Software: Using Speculation, Recovery, and Adaptive Retranslation to Address Real-Life Challenges," 2003, ACM International Conference Proceedings Series, vol. 37, Proceedings of the International Symposium on Code Generation and Optimization: Feedback-directed and Runtime Optimization, Abstract, 9 pages.

Ebcioglu, et al., "DAISY: Dynamic Compilation for 100% Architectural Compatibility," 1997, Proceedings of the 24th International Symposium on Computer Architecture, 13 pages.

Microsoft .NET Framework, http://www.microsoft.com/net/, accessed Oct. 13, 2009, 1 page.

International Search Report and Written Opinion dated Feb. 3, 2011 in PCT Application No. PCT/US10/53110.

U.S. Office Action dated Jan. 31, 2012 in U.S. Appl. No. 12/578,321.

U.S. Office Action dated Jul. 5, 2012 in U.S. Appl. No. 12/578,321.

U.S. Office Action dated Jun. 21, 2012 in U.S. Appl. No. 12/578,336.

U.S. Office Action dated Nov. 14, 2011 in U.S. Appl. No. 12/582,301.

U.S. Office Action dated Jun. 28, 2012 in U.S. Appl. No. 12/582,301.

Kang et al., "Preliminary Study toward Intelligent Run-time Resource Management Techniques for Large Multi-Core Architectures," Apr. 15, 2008, University of Southern California—Information Sciences Institute, 2 pages.

Song, et al., "Analytical Modeling and Optimization for Affinity Based Tread Scheduling on Multicore Systems", Jul. 14, 2009, IEEE CLUSTER 2009, New Orleans, Louisiana, 10 pages.

Song, et al., "Feedback-Directed Thread Scheduling with Memory Considerations," ACM, Jun. 2007, pp. 1-10.

Brooks et al., "Dynamic Thermal Management for High-Performance Microprocessors" Jan. 2001, Proceedings of the 7th International Symposium on High Performance Computer Architecture, 12 pages.

Donald et al., "Techniques for Multicore Thermal Management: Classification and New Exploration". Jun. 2006, Proceedings of the 33rd Annual International Symposium on Computer Architecture, pp. 78-88.

Shirako et al., "Compiler Control Power Saving Scheme for Multi Core Processors" In Lecture Notes in Computer Science: Languages and Compilers for Parallel Computing. vol. 4339/2006. Springer-Verlag, Berlin, pp. 362-376, 2007.

"P6T New Era for Ultimate Performance! Intel® Core™ i7 Platform," accessed at http://www.asus.com/Motherboards/Intel_Socket_1366/P6T/, accessed on Mar. 5, 2012, pp. 4.

U.S. Office Action dated Nov. 21, 2012 in U.S. Appl. No. 12/578,336.

U.S. Notice of Allowance dated Sep. 17, 2013 in U.S. Appl. No. 12/578,336.

Japanese Office Action dated Sep. 3, 2013 in Japanese Application No. 2012535286 Abstract.

U.S. Office Action dated Sep. 5, 2013 in U.S. Appl. No. 12/578,321.

* cited by examiner

PARALLEL DYNAMIC OPTIMIZATION

BACKGROUND

Unless otherwise indicated herein, the materials described in this section are not prior art to the claims in this application and are not admitted to be prior art by inclusion in this section.

Dynamic compilations performed by compilers leveraging dynamic optimization attempt to improve the operation of software or microcode at runtime. These dynamic optimization systems may make repeated iterated executions through dynamically compiled code in attempts to find compilation optimizations. For example, procedure calls having high demand may be tracked to focus optimization on those procedure calls. Traditional dynamic optimization systems generally do not perform more complex optimizations that require additional understanding of code behavior. Furthermore, code may generally be optimized to a conservative level to ensure functionality of the resultant executable code.

Multicore processors are generally made up of multiple processor cores with interconnections between the individual cores. As core counts within multicore processors increase, making effective use of the multiple cores within a system becomes an important operational consideration. Computers having multiple processors or multiple processor cores may often lack apparent parallelizable operations to make use of the multiple processors or processing cores.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
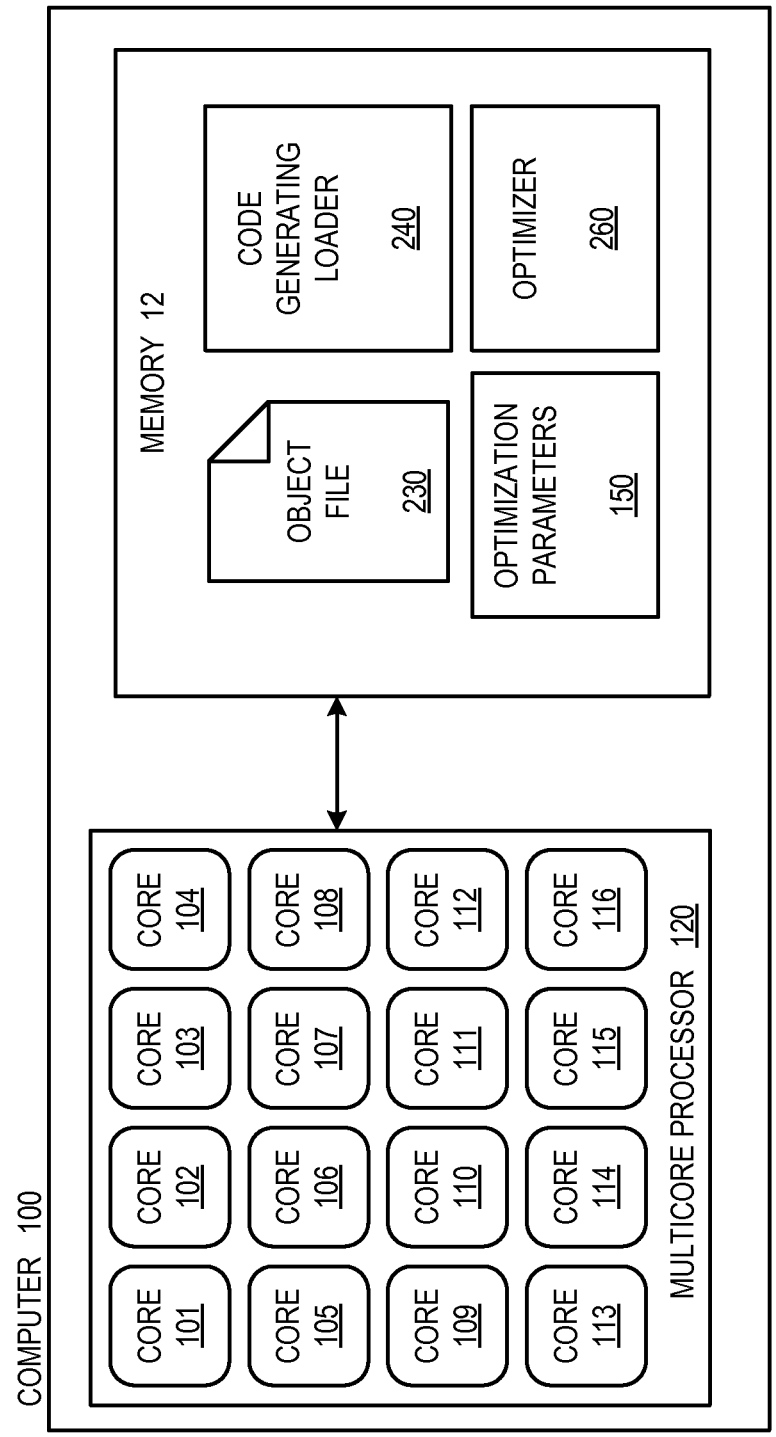
FIG. 1 is a block diagram illustrating a computer having a multicore processor and a memory configured with executable software components for performing parallel dynamic optimization using multiple cores of the multicore processor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures can be arranged, substituted, combined, separated, and designed in a wide variety of different configurations, all of which are explicitly contemplated herein. It should be appreciated that while multicore processor embodiments are discussed throughout this disclosure, various other multiprocessor or parallel computing architectures may be leveraged for the parallel dynamic optimization technologies discussed herein. As such, a processing unit may be a core within one or more multicore processors, a processor within a multiprocessor system, a processor within any other parallel processing architecture, or any combination thereof.

This disclosure is generally drawn to methods, apparatus, systems, and computer program products related to parallel dynamic optimization. Runtime compilation performed by compilers leveraging dynamic optimization (DO) attempt to improve the operation of software or microcode at runtime. Examples of DO systems include CODE MORPHING from TRANSMETA, DAISY from INTERNATIONAL BUSINESS MACHINES CORPORATION, DYNAMO from HEWLETT PACKARD CORPORATION, various JAVA virtual machines, MICROSOFT® .NET from MICROSOFT CORPORATION, and the INTEL® IA32 Execution Layer from INTEL CORPORATION.

According to various embodiments presented herein, a runtime compiler may be adapted to generate many instances of executable code. The various instances of executable code may be generated with variations of optimization parameters such that the code instances each express different optimization attempts. A multiprocessor system, such as a multicore processor in one or more embodiments, may be leveraged to simultaneously execute some or all of the various code instances. Preferred optimization parameters may be determined from the executable code instances that correctly complete in the least time, or use the least amount of memory, or prove superior according to some other fitness metric. Preferred optimization parameters may be used to seed future optimization attempts, while the less desirable optimization parameters may be avoided. Output generated from the code instances using preferred optimization parameters may be used as soon as they correctly complete operation.

FIG. 1 is a block diagram that illustrates a computer 100 having a multicore processor 120 and a memory 12 configured with executable software components for performing parallel dynamic optimization using multiple cores 101-116 of the multicore processor 120 according to one or more embodiments presented herein. The computer 100 may employ the multiple cores 101-116 of the multicore processor 120 to perform various computing tasks. The computing tasks may include the execution of code such as an object file 230. The object file 230 may be described as a portable intermediate software module. Such a portable intermediate representation may also be referred to as a thin binary, a slim binary, or a partially compiled code module. The object file 230 may contain partially compiled code from which a final generation of executable code is performed at runtime by a code generating loader 240. The code generating loader 240 may be configured to generate many parallel, or simultaneous, instances of the executable code where each instance may be generated using different optimization parameters 150. The optimization parameters 150 may specify settings for various compiler optimization options to be used by the code generating loader 240 as discussed in further detail below.

The various code instances created by the code generating loader 240 may be executed in parallel, each on a respective core 101-116 of the multicore processor 120. An executable code instance having a faster, or more efficient, correct completion may be considered to have been generated using a preferred set of optimization parameters 150. Such a code instance may be referred to herein as the preferred instance. Results of the code execution may be provided from the code instance using the preferred optimization parameters as they become available. Other instances of executable code, still executing, may be terminated or observed once the preferred instance completes its execution. An optimizer 260 may be associated with execution of the generated code for identifying preferred instances of executable code and the associated preferred optimization parameters 150. The optimizer 260 may use the preferred optimization parameters 150, or variations thereof, to inform further operation of the code generating loader 240.

The memory 12 may be coupled to the multicore processor 120 to support the techniques discussed herein. For example, the memory 12 may be configured to store one or more of the object file 230, the code generating loader 240, the optimization parameters 150, and/or the optimizer 260. The code generating loader 240 and the optimizer 260 may be executed in association with the multicore processor 120 to apply parallel dynamic optimization techniques to the execution of the object file 230. The parallel dynamic optimization may leverage one or more of the cores 101-116 of the multicore processor 120 to approximately optimize the runtime compilation of the object file 230. It should also be appreciated that the techniques discussed herein may be implemented as hardware modules within, or associated with, the multicore processor 120. The modules may also be combinations of hardware and software according to various embodiments. For example, functionality of the code generating loader 240 and the optimizer 260 may be performed by one or more hardware modules. Additional details regarding the computer 100, including the operation of the memory 12, are further detailed with respect to FIG. 5.

Figure 2:
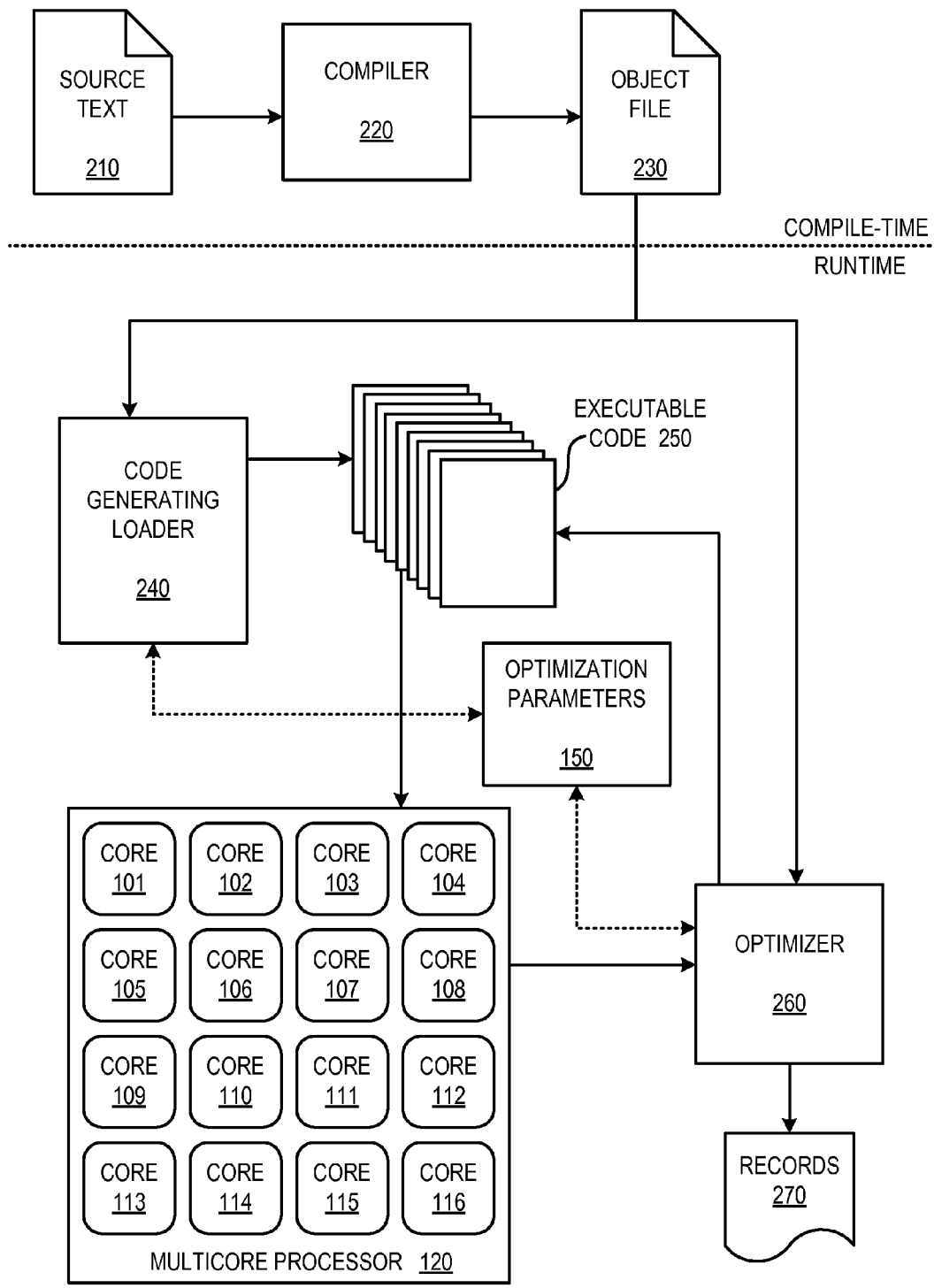
FIG. 2 is a block diagram illustrating parallel dynamic optimization during the runtime execution of multiple instances of executable code.

Turning now to FIG. 2, a block diagram illustrates parallel dynamic optimization during the runtime execution of multiple instances of executable code 250 according to one or more embodiments presented herein. At compile time, the compiler 220 may compile source code from a source text 210 into an object file 230. The object file 230 may be a portable intermediate software module. The object file 230 may be distributed to various types of computing machines, such as the computer 100, where compilation of the object file 230 may be completed locally. Local completion of the compilation may be performed at runtime. According to various embodiments, the object file 230 may run locally on the computer 100 in association with a virtual machine, a media player, a runtime player, an application plug-in, a runtime compiler, or a just-in-time (JIT) compiler.

In association with the computer 100, the object file 230 may be further converted into executable code 250 by a code generating loader 240. Multiple instances of the executable code 250 may be generated by the code generating loader 240. The multiple instances of the executable code 250 may be based on varying the optimization parameters 150 used by the code generating loader 240. The optimization parameters 150 to be optimized, and the optimization ranges of these parameters, may be dependent upon characteristics of the computer 100 or the code generating loader 240. According to embodiments, parameters that may be approximately optimized may include memory block sizes, memory usage, cache sizes, cache access protocols, disk access protocols, levels of loop unrolling, and balance of recalculation versus storage or look-up tables. The parameters that may be approximately optimized may also be related to the capabilities and available resources of the computer 100 where the executable code 250 is to be executed.

The code generating loader 240 may be adapted to generate many parallel, or simultaneous, instances of the executable code where each instance may be generated using different optimization parameters 150. The various code instances may be executed in parallel, each on one or more of cores 101-116 of the multicore processor 120. The optimizer 260 may be associated with execution of the generated code for identifying preferred instances of executable code 250. From the preferred instances, the optimizer 260 may be adapted to determine desirable values for the optimization parameters 150. The optimizer 260 may be configured to use the preferred optimization parameters, or variations thereof, to inform further operation of the code generating loader 240.

The preferred optimization parameters, or variations thereof, may be stored into a database, file, memory, or other storage medium associated with optimization result records 270. The optimization result records 270 may then provide the preferred optimization parameters for use in future executions of the object file 230, or future operation of the code generating loader 240. According to other embodiments, the optimization result records 270 may be uploaded by computer 100 via a network adapter over a communication network link to a network archive. The network archive may be a database, file, memory, or other storage medium associated with archiving the optimization parameters. The network archive may be used to establish and/or suggest improved optimization parameters 150 for the related object file 230. Once uploaded, the optimization parameters 150 may be delivered to another computer 100 when the computer 100 downloads the object file 230. The computer 100 may then use delivered optimization parameters 150 to provide suggested starting points for optimization parameters 150 as the computer 100 executes the object file 230.

The methodologies presented herein for parallel dynamic optimization on multicore processors may support riskier optimization strategies for some instances of the parallel executions. In some cases, taking large optimization risks may result in code that executes very slowly or even fails to execute. Even where these uncertain performance effects may result, the parallel nature of the executions may tolerate failure of some of the executing instances. Thus, more aggressive optimization may be attempted in contrast to traditional systems. Traditional optimization system may identify a safe setting of optimization parameters 150 that are least likely to fail and then optimize around that safe set even though performance may be less than achieved when higher levels of optimization are aggressively pursued.

The methodologies presented herein for parallel dynamic optimization on multicore processors may also support optimization that generally cannot be done prospectively by altering optimization parameters 150. For example, possible optimization parameters are memory block size or stack priority. These parameters may be difficult to optimize prior to code execution. In an empirical example, a particular mathematical program may be optimized for optimization parameters related to modifying memory access block sizes, where the optimal block sizes are difficult to predict. This type of optimization parameter 150 is one example that traditional dynamic optimization systems may not be able to optimize because the relationship between the parameter and performance may be unpredictable. The resulting performance may vary dramatically and there may be no clear monotonic trend to the performance as a function of the optimization parameters 150. Such unpredictable optimizations may be very difficult for optimization. However, the parallel execution of many instances of executable code 250 in the parallel dynamic optimization system presented herein may support a rapid convergence towards increasingly desirable settings for the optimization parameters 150 by the code generating loader 240 and the optimizer 260.

The optimization parameters 150 may be approximately optimized within a multicore system by executing multiple instances of executable code 250 on different cores 101-116. The multiple instances of executable code 250 may each have different setting of the optimization parameters 150. The underperforming instances may be terminated and the preferred performers may be allowed to continue. A preferred performer of the multiple instances of executable code 250 may be identified by the optimizer 260 as having a more desirable performance level according to one or more specified fitness metrics. The optimization may be iterated by branching out from the preferred solutions or by generating new parameter mixes to test on other cores 101-116 as they become available.

The parallel dynamic optimization techniques for multi-core processors presented herein may scale with the number of available processor cores 101-116. For example, if 128 cores are available and two are being used for the operating system and basic services, then 126 of the cores may be used for parallel dynamic optimization. If two different programs require optimization, the code generating loader 240 may generate 63 instances of executable code 250 for each program. Each program may then be executed on 63 cores. According to various embodiments, two separate optimizations may result in reallocation of cores between the two optimizations under an effective cost strategy based on one or more desired performance goals or other metrics. The optimizations may be performed using sets of cores that are selected to trade off processor cores 101-116 based on cost functions so that optimizations do not consume more resources than desired.

Multicore processors 120 are available with increasing numbers of cores. The technology discussed herein is one example application that can capitalize on the increasing computational power of multicore processors 120 even where the application programs themselves may not be easily parallelizable. Available cores may be used to explore an optimization space that was previously unavailable for runtime code optimization. These improved optimizations may be utilized to speed up the execution of object files 230 on the computer 100.

The parallel dynamic optimization techniques for multi-core processors discussed herein may be applied to software systems commonly in use. Runtime compiled and optimized systems such as JAVA from SUN MICROSYSTEMS, the MICROSOFT® .NET runtime from MICROSOFT CORPORATION, ACTIVE X™ from MICROSOFT CORPORATION, FLASH PLAYER from ADOBE SYSTEMS INCORPORATED, and other similar web browser plug-in technologies are increasingly common as the web browser becomes more involved in application execution. The parallel code optimization techniques presented herein may also be applied to dynamic optimization systems utilized in cloud computing applications.

It should also be appreciated that the parallel dynamic optimization approaches presented herein may, in the worse case, provide a similar level of optimization as the best case results of traditional dynamic optimization systems where non-parallel executions may be iterated. The parallel dynamic optimization approach may, in many cases, provide significantly better optimization than the traditional techniques.

Figure 3:
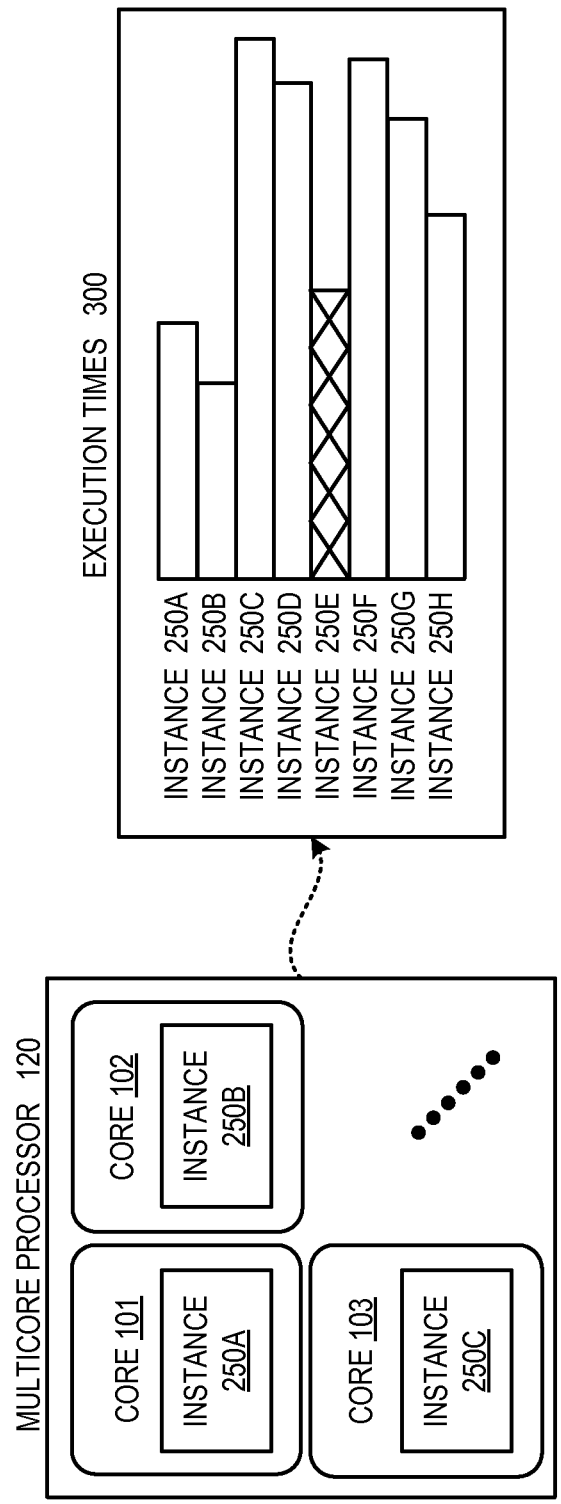
FIG. 3 is a block diagram illustrating executable code instances within cores of a multicore processor and a graph of execution times for the instances of executable code.

Turning now to FIG. 3, a block diagram illustrates executable code instances 250A-250H within cores 101-116 of a multicore processor 120 and a graph of execution times 300 for the instances 250A-250H of executable code 250 according to one or more embodiments presented herein. When multiple instances 250A-250H of executable code 250 are generated from the object file 230 by the code generating loader 240, the instances 250A-250H may each be executed on one or more of the cores 101-116 of the multicore processor 120. One aspect of the optimizer 260 may be to act as a profiler for the multiple instances 250A-250H of executable code 250 as they are executed. As a profiler, the optimizer 260 may be adapted to track a metric of optimization for each of the instances 250A-250H of executable code 250. Examples of metrics may include execution time, memory usage, context changes, cache misses, prediction failures, energy consumption, any other operation metric of a computing machine, or any combination thereof. As such, it should be appreciated that the bar chart of execution times 300 illustrated in FIG. 3 is merely one example of a performance or fitness metric.

The bar chart of execution times 300 illustrates a comparison of example execution time metrics for each of eight parallel instances 250A-250H of executable code 250. According to the values illustrated in the bar chart of execution times 300, instance 250B had the shortest execution time. Thus, instance 250B may be identified by the optimizer 260 as the preferred instance. The optimization parameters 150 associated with instance 250B may be specified as the preferred optimization parameters 150. The preferred optimization parameters 150 may be stored to the optimization result record 270 for use in future executions of the code. The preferred optimization parameters may also be used to seed further optimization iterations.

According to the values illustrated in the bar chart of execution times 300, the executable code instances 250C and 250F may be identified by the optimizer 260 as less desirable instances. Optimization parameters 150 associated with the less desirable instances 250C and 250F may be flagged for avoidance in future executions. The less desirable optimization parameters may also be fed back to the code generating loader 240. The code generating loader 240 may then use the information to inform further optimization iterations. The executable code instance 250E may have failed to complete correctly. Optimization parameters 150 associated with the executable code instance 250E that fails to complete may be fed back to the code generating loader 240 so that these parameter settings may be avoided in future executions.

The execution times 300 may be collected by the optimizer 260 for comparison to one another. The optimizer 260 may be a program that executes at the level of applications or operating systems of the computer 100 using the multicore processor 120. The optimizer 260 may also be associated with the firmware or basic input/output system (BIOS) of the associated computing system. According to other embodiments, the optimizer 260 may be provided within the multicore processor 120 in the form of one or more hardware modules or circuits. The optimizer 260 may be also be provided in the form of one or more hardware modules or circuits within the computer 100.

Figure 4:
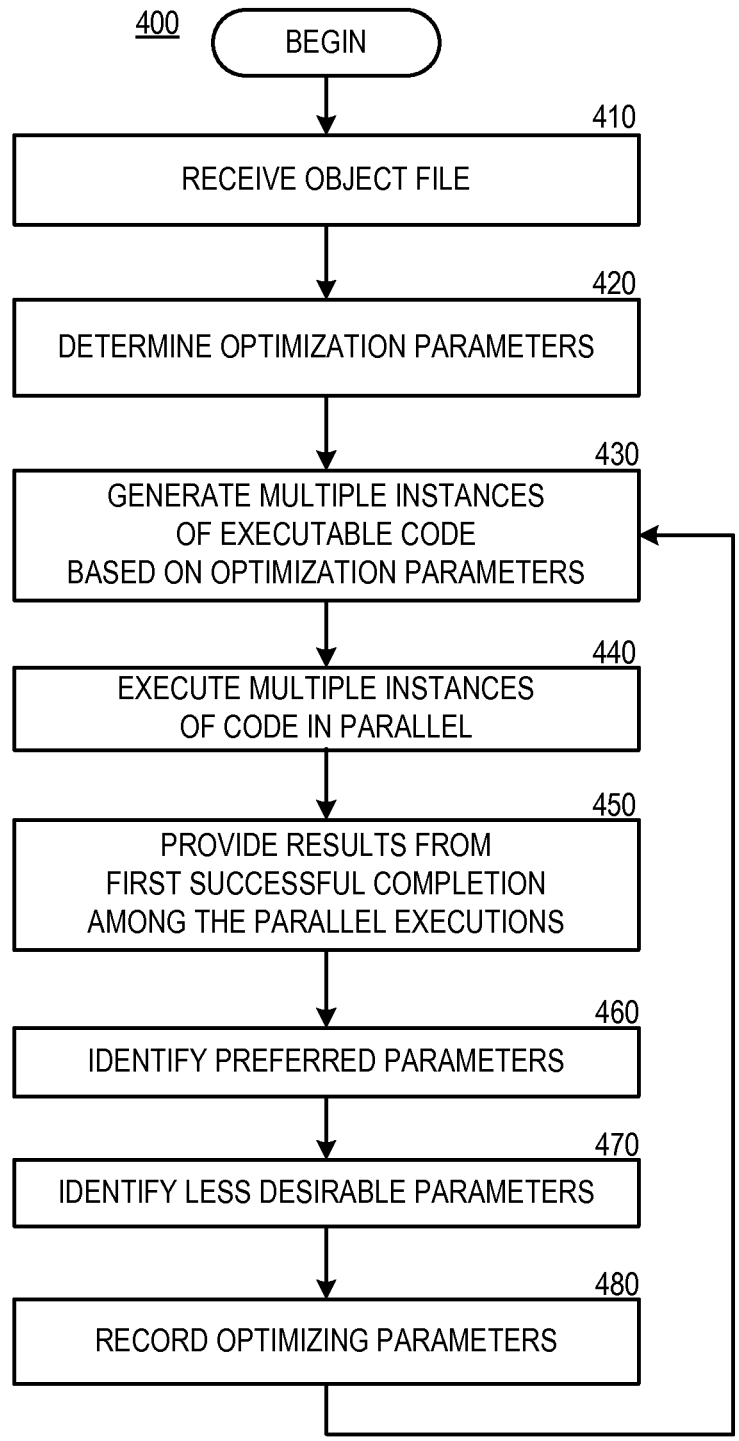
FIG. 4 is a flow diagram illustrating a process for parallel dynamic optimization using multicore processors.

Referring now to FIG. 4, additional details will be provided regarding the embodiments presented herein for dynamic optimization that leverages multicore processors 120. In particular, FIG. 4 is a flow diagram illustrating a process 400 for parallel dynamic optimization using multicore processors according to at least some embodiments presented herein. Process 400 may include one or more operations, functions or actions as illustrated by one or more of blocks 410, 420, 430, 440, 450, 460, 470, and/or 480.

It should be appreciated that the blocks described herein may be implemented as a sequence of computer implemented instructions or program modules running on a computing system, as interconnected machine logic circuits or circuit modules within the computing system, or some combination thereof. The implementation is a matter of choice dependent on the performance and other requirements of the various embodiments. Some of the logical operations described herein are referred to variously as state operations, functions, structural devices, actions, or modules. These operations, functions, structural devices, actions and modules may be implemented in software, in firmware, in special purpose digital logic, and any combination thereof. It should also be appreciated that in some implementations one or more of the illustrated blocks may be eliminated, combined or separated into additional blocks than those shown in the figures and described herein. These blocks may also be performed sequentially, in parallel, or in a different order than those described herein.

The process 400 may begin at block 410 (Receive Object File), where an object file 230 may be received at the computer 100. The object file 230 may be a thin binary, a portable intermediate representation, or any other compiled or partially compiled program code representation. The object file 230 may be received at the computer 100 from a network into a player, web browser, or other runtime system. The object file 230 may also be delivered to the computer 100, or a user of the computer 100, on a computer readable storage medium or provided as part of the preinstalled code of the computer 100.

Processing may continue from block 410 to block 420 (Determine Optimization Parameters), where the code generating loader 240 may determine optimization parameters 150 for dynamically optimizing the execution of the received object file 230. As discussed above, examples of optimization parameters 150 may include memory block size, cache size, cache access protocols, memory access protocols, cache update policies, repeated computation versus look-up tables, loop unrolling, and various other computational optimization techniques known in the art. For each of the optimization parameters 150, a range of optimization may be established. A starting point within each range may also be specified for beginning the optimization. An appropriate metric of performance or fitness may also be selected by the code generating loader 240 for measuring the effectiveness of variations in the selected optimization parameters 150.

Processing may continue from block 420 to block 430 (Generate Multiple Instance of Executable Code Based on Optimization Parameters), where the code generating loader 240 may be adapted to generate multiple instances of executable code 250 based on the object file 230 and the optimization parameters 150 determined at block 420. According to some embodiments, one set of executable code 250 instances may be generated by the code generating loader 240 with optimization parameter combinations that evenly span the rages of the optimization parameters 150. Such an optimization may then be iterated using preferred outcomes from the first set so as to perform a course-to-fine search of the optimization space. Other embodiments may focus on variations around the initial suggested values for the optimization parameters 150. Various other embodiments may select initial optimization parameters randomly, using weighted functions, using prior knowledge of execution according to a type of program or according to the source of a program. These and other approaches for initializing the optimization parameters 150 may be applied within the spirit and scope of the technology discussed herein.

Processing may continue from block 430 to block 440 (Execute Multiple Instances of Code in Parallel), where the multiple instances of executable code 250 generated at block 430 may be executed in parallel on the multicore processor 120. The optimizer 260 may be arranged to profile the parallel execution of the multiple instances of executable code 250 to identify which of the instances of executable code 250 may be the most optimized for execution on the multicore processor 120.

Continuing from block 440 to block 450 (Provide Results from First Successful Completion among the Parallel Executions), the results from the first successful completion among the parallel executions of the executable code 250 may be provided as the results from the execution of the object file 230. These results may be provided to a user or to a process or application that called for the execution of the object file 230. The completion times of the other respective instances of executable code 250 may also be tracked for optimization purposes.

Continuing from block 450 to block 460 (Identify Preferred Parameters), the preferred parameters may be identified by the optimizer 260. As mentioned above, the preferred parameters may be the parameters associated with the first successful completing instances of the executable code 250. According to other embodiments, the preferred parameters may be the parameters associated with the instances of the executable code 250 approximately maximizing, minimizing, or best balancing various other fitness metrics as discussed herein.

Continuing from block 460 to block 470 (Identify Less Desirable Parameters), the less desirable parameters may be identified by the optimizer 260. The less desirable parameters may be associated with instances of executable code 250 that may not complete or instances of the executable code 250 that may complete in a longer period of time or using more resources than those associated with the preferred parameters in block 460.

Continuing from block 470 to block 480 (Record Optimizing Parameters), the optimizing parameters 150 associated with the preferred instances of executable code 250 and the less desirable instances of executable code 250 may be stored by the code generating loader 240 or the optimizer 260 into the optimization result record 270 as discussed above. The resulting optimization parameters may be used to inform future compilation and execution of the object file 230. The resulting optimization parameters 150 may also be used to inform refinement of the optimization by seeding the generation of another round of multiple instances of the executable code 250 as discussed with respect to block 430. As such, the process 400 may loop back to block 430.

Figure 5:
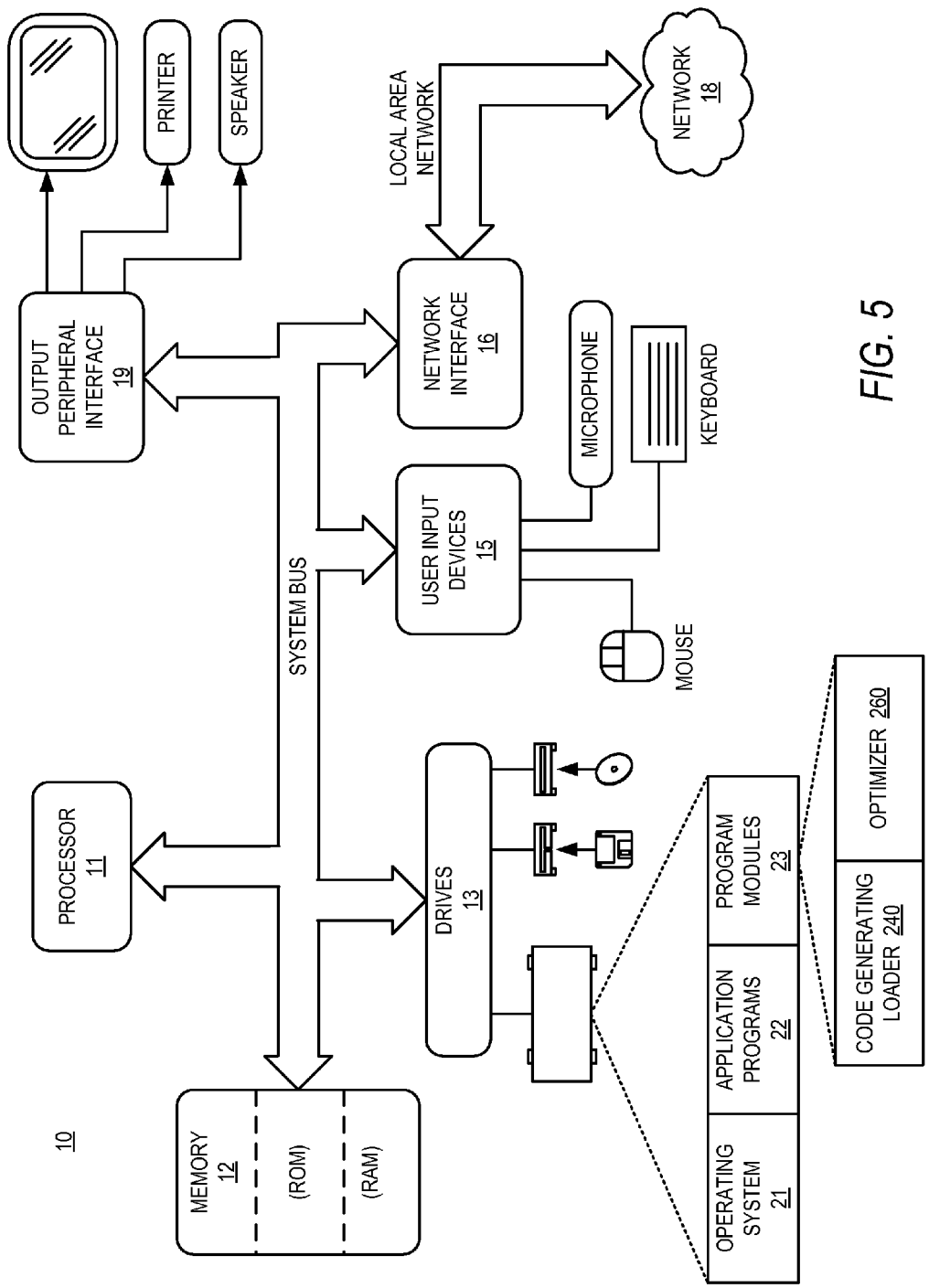
FIG. 5 is a block diagram illustrating an example computing system.

With reference to FIG. 5, an example computing system for implementing various embodiments presented herein will be discussed. The computing system includes a computer 10. According to various embodiments, the computer 10 may be the computer 100 discussed with respect to FIG. 1. The computer 10 may include a processor 11, a memory 12 and one or more storage drives 13. The storage drives 13 and their associated computer storage media may provide storage of computer readable instructions, data structures, program modules 23 and other data for the computer 10. The computing system may be adapted to support embodiments for implementing parallel dynamic optimization using one or more multicore processors 120. For example, the computing system may comprise program modules 23 such as the code generating loader 240 and the optimizer 260. Various embodiments may include computers, dedicated hardware, or embedded computing systems.

The computer 10 may be implemented as a conventional computer system, an embedded control computer, a laptop, or a server computer, a mobile device, a set-top box, a kiosk, a vehicular information system, a mobile telephone, a customized machine, or other hardware platform. The processor 11 may be a general purpose processor, a processor core, a multiprocessor, a multicore processor 120, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof. The processor 11 may support parallel dynamic optimization leveraging multicore processors as discussed herein.

The storage drives 13, other storage devices, or their associated computer-readable storage media may store an operating system 21, application programs 22, and program modules 23. The computer 10 may include user input devices 15 through which a user may enter commands and data. Input devices may include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices may be coupled to processor 11 through a user input interface that is coupled to a system bus. The input devices may also be coupled by other interface and bus structures, such as a parallel port, game port or a universal serial bus (USB). Computers such as computer 10 may also include other peripheral output devices such as speakers, which may be coupled through an output peripheral interface 19 or similar interface.

The computer 10 may operate in a networked environment using logical connections to one or more computers, such as a remote computer coupled to network interface 16. The remote computer may be a personal computer, a server, a router, a network PC, a peer device, or other common network node. The remote computer may include many or all of the elements described herein relative to the computer 10. Networking environments may include networks (WAN), local area networks (LAN), intranets, the Internet, or combinations thereof.

When used in a LAN or wireless LAN (WLAN) networking environment, the computer 10 may be coupled to the LAN through a network interface 16 or a network adapter. When used in a WAN networking environment, the computer 10 may include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computer 10 may be configured such that the processor 11 and/or program modules 23 may perform parallel dynamic optimization leveraging multicore processors in accordance with various embodiments presented herein. The computer 10 may include one or more instances of a physical computer-readable storage medium or media associated with storage drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with semiconductor memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23 such as the code generating loader 240 and the optimizer 260 for performing parallel dynamic optimization. The program modules 23 may include software instructions that, when loaded into the processor 11 and executed, transform a general-purpose computing system into a special-purpose computing system customized to facilitate all, or part of, the parallel dynamic optimization techniques disclosed herein. As detailed throughout this description, the program modules 23 may provide various tools or techniques by which the computer 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 11 transitions between states, thereby transforming the transistors or other circuit elements constituting the processor 11 from a first machine to a second machine, wherein the second machine may be specifically configured to support parallel dynamic optimization leveraging multicore processors. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor-based memory 12 when the software is encoded therein. For example, the software may transform the state of transistors, capacitors, or other discrete circuit elements constituting the semiconductor-based memory 12.

As another example, the storage media may be implemented using magnetic or optical technology such as storage drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 6:
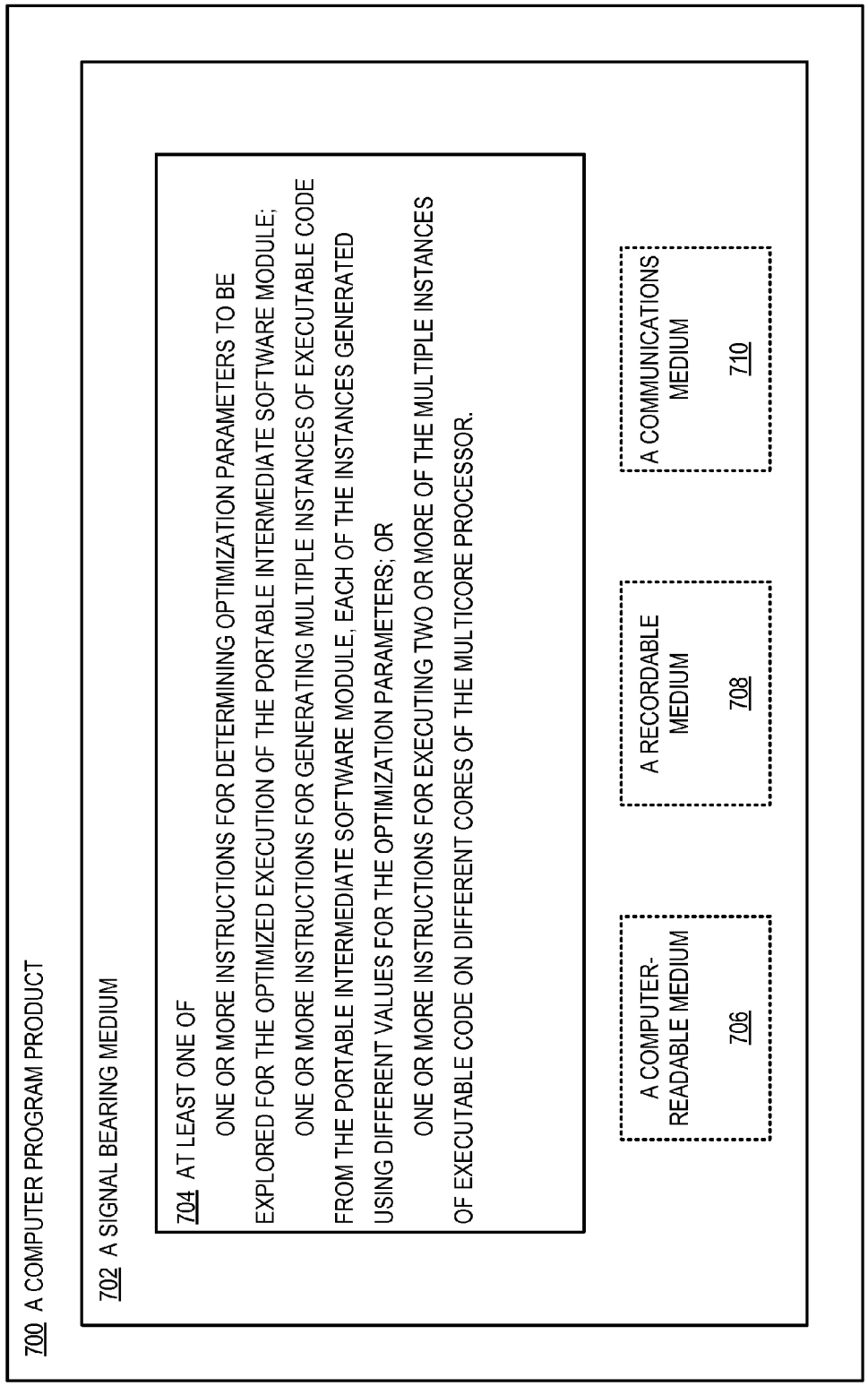
FIG. 6 is a schematic illustrating a partial view of a computer program product that includes a computer program for executing a computer process on a computing device, all arranged according to at least some embodiments presented herein.

Turning now to FIG. 6, a schematic illustrates a partial view of a computer program product 700 that includes a computer program for executing a computer process on a computing device, according to at least some embodiments presented herein. An illustrative embodiment of the example computer program product is provided using a signal bearing medium 702, and may include at least one instruction of 704: one or more instructions for determining optimization parameters to be explored for the optimized execution of the portable intermediate software module; one or more instructions for generating multiple instances of executable code from the portable intermediate software module, each of the instances generated using different values for the optimization parameters; or one or more instructions for executing two or more of the multiple instances of executable code on different cores of the multicore processor. The one or more instructions may be, for example, computer executable and/or logic implemented instructions. In some embodiments, the signal bearing medium 702 of the one or more computer program products 700 include a computer-readable medium 706, a recordable medium 708, and/or a communications medium 710.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of the described systems by an RF signal bearing medium 702, where the signal bearing medium 702 is conveyed by a wireless form of communications medium 710 (e.g., a wireless communications medium conforming with the IEEE 802.11 standard).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A computer-implemented method for parallel dynamic optimization of a portable intermediate software module, the method comprising:
   sequentially generating
      a first instance of executable code from the portable intermediate software module, the first instance generated using a first set of values as optimization parameters, and
      a second instance of executable code from the portable intermediate software module, the second instance generated using a second set of values as optimization parameters wherein the second set of values varied from the first set of values;
   executing substantially in parallel
      the first instance of executable code on a first processor core of a multicore processor, and
      the second instance of executable code on a second processor core of the multicore processor; and
   identifying a preferred instance of executable code executing on one of the first processor core and the second processor core of the multicore processor based on a highest ranked fitness metric from ranking fitness metrics evaluated for the first instance of executable code while executing on the first processor core of the multicore processor, and fitness metrics evaluated for the second instance of executable code while executing on the second processor core of the multicore processor.

2. The computer-implemented method of claim 1, further comprising:
   selecting the preferred instance of executable code executing on one of the first processor core or the second processor core of the multicore processor associated with the highest ranked fitness metric.

3. The computer-implemented method of claim 1, further comprising:
   sequentially generating additional instances of executable code each using different values for the optimization parameters based upon optimization parameters associated with the preferred instance of executable code executing on one of the first processor core and the second processor core of the multicore processor.

4. The computer-implemented method of claim 1, further comprising storing an optimization parameter record in association with the portable intermediate software module, the optimization parameter record comprising optimization parameters associated with the preferred instance of executable code executing on one of the first processor core and the second processor core of the multicore processor.

5. The computer-implemented method of claim 1, wherein the fitness metrics correspond to one or more of an execution time on one of the first processor core and the second processor core of the multicore processor, a memory usage of the executable code on a processor core of the multicore processor, or a power consumption of the executable code on a processor core of the multicore processor.

6. The computer-implemented method of claim 1, wherein the optimization parameters comprise:
   one or more of a block size associated with memory usage of the executable code on one of the first processor core and the second processor core of the multicore processor;
   a total memory usage of the executable code on one of the first processor core and the second processor core of the multicore processor;
   a power consumption associated with processing executable code on one of the first processor core and the second processor core of the multicore processor; and
   an execution time associated with processing executable code on one of the first processor core and the second processor core of the multicore processor.

7. The computer-implemented method of claim 1, wherein substantially in parallel comprises having some overlap in time.

8. A non-transitory computer storage medium having computer-executable instructions stored thereon for a method which, when executed by a computer having a multicore processor performs parallel dynamic optimization of a portable intermediate software module, the method comprising:
   determining optimization parameters to be explored for the optimized execution of the portable intermediate software module;
   sequentially generating multiple instances of executable code from the portable intermediate software module, each of the sequentially generated multiple instances generated using different values for the optimization parameters;
   executing substantially in parallel two or more of the multiple instances of executable code on different processor cores of the multicore processor; and
   identifying a preferred instance of executable code executing on a respective core of the multicore processor based on a highest ranked fitness metric from ranking fitness metrics evaluated for each of the two or more of the multiple instances of executable code executing substantially in parallel on the respective cores of the multicore processor.

9. The non-transitory computer storage medium of claim 8, wherein the preferred instance of executable code is associated with the highest ranked fitness metric.

10. The non-transitory computer storage medium of claim 9, the method further comprising sequentially generating additional instances of executable code each using different values for the optimization parameters based upon optimization parameters associated with the preferred instance of executable code executing on the respective core of the multicore processor.

11. The non-transitory computer storage medium of claim 8, wherein each fitness metric associated with the respective one of the multiple instances of executable code corresponds to one or more of
   a measure of the execution time on a processor core of the multicore processor, a measure of memory usage of the executable code on a processor core of the multicore processor, or a measure of energy resources consumed during an execution time of the respective ones of the multiple instances of executable code on a processor core of the multicore processor.

12. The non-transitory computer storage medium of claim 8, wherein substantially in parallel comprises concurrently, overlapping in time, or partially overlapping in time.

13. A multicore computing system comprising:

a multicore processing unit having a plurality of cores; and a runtime module configured to receive a portable intermediate software module, sequentially generate multiple instances of executable code from the portable intermediate software module, each of the sequentially generated instances having different optimization settings associated therewith, execute substantially in parallel each of the sequentially generated multiple instances of executable code on different ones of the plurality of cores of the multicore processing unit, and identify a preferred instance of the sequentially generated multiple instances of executable code executing on respective cores of the multicore processing unit based on a highest ranked fitness metric from ranking fitness metrics evaluated for each of the sequentially generated multiple instances of executable code executing on the different ones of the plurality of cores of the multicore processing unit.

14. The multicore computing system of claim 13, wherein the runtime module is further configured to:

identify the highest ranked fitness metric.

15. The multicore computing system of claim 14, wherein the runtime module is further configured to iterate the sequential generation of multiple instances of executable code using optimization settings varied from the optimization settings associated with the preferred instance of executable code executing on the respective processor core of the multicore processing unit from the previous iteration.

16. The multicore computing system of claim 13, wherein the multiple instances of sequentially generated executable code are generated in a quantity related to the number of available cores within the multicore processing unit.

17. The multicore computing system of claim 14, wherein the runtime module is further configured to store the optimization settings associated with the preferred instance of executable code executing on the respective processor core of the multicore processing unit for association with the portable intermediate software module.

18. The multicore computing system of claim 13, wherein values for the optimization settings are initially determined from a default set of values.

19. The multicore computing system of claim 18, wherein the default set of values are received with the portable intermediate software module.

20. The multicore computing system of claim 13, wherein substantially in parallel comprises concurrently, overlapping in time, or partially overlapping in time.

* * * * *